United States Patent
Gaffney

(10) Patent No.: US 9,485,896 B1
(45) Date of Patent: Nov. 8, 2016

(54) WEED AND SWEEP TOOL

(71) Applicant: Timothy J. Gaffney, East Hampton, NJ (US)

(72) Inventor: Timothy J. Gaffney, East Hampton, NJ (US)

( * ) Notice: Subject to any disclaimer, the term of this patent is extended or adjusted under 35 U.S.C. 154(b) by 0 days.

(21) Appl. No.: 14/840,100

(22) Filed: Aug. 31, 2015

Related U.S. Application Data

(60) Provisional application No. 62/072,126, filed on Oct. 29, 2014.

(51) Int. Cl.
*A01B 1/16* (2006.01)
*A01B 1/20* (2006.01)
*A46B 15/00* (2006.01)

(52) U.S. Cl.
CPC . *A01B 1/16* (2013.01); *A01B 1/20* (2013.01); *A46B 15/0055* (2013.01)

(58) Field of Classification Search
CPC ............ A01B 1/20; A01B 1/22; A01B 1/16; A46B 15/00; A46B 15/0055; A47L 13/12
See application file for complete search history.

(56) References Cited

U.S. PATENT DOCUMENTS

| | | | |
|---|---|---|---|
| 1,056,614 A | 3/1913 | Weikert | |
| 1,464,353 A * | 8/1923 | Crinella | A01C 5/02 294/51 |
| 1,483,760 A | 2/1924 | Yoshizawa | |
| 1,484,948 A | 2/1924 | Kimberlin | |
| 1,785,531 A | 12/1930 | Roesch et al. | |
| 1,865,671 A | 7/1932 | Breen | |
| 3,733,636 A | 5/1973 | Osadsky | |
| 4,367,798 A * | 1/1983 | Sabol | A01L 11/00 168/45 |
| 4,858,266 A * | 8/1989 | Engstrom | A47L 13/06 15/111 |
| 5,438,726 A * | 8/1995 | Leite | A46B 7/04 132/309 |
| 5,447,572 A * | 9/1995 | LaClair | B08B 1/00 134/22.1 |
| 5,601,322 A * | 2/1997 | Forest | A01K 63/006 15/105 |
| 5,727,829 A | 3/1998 | Bellichak | |
| 8,375,499 B1 | 2/2013 | Marino | |
| 2004/0094180 A1 * | 5/2004 | Hsu | A46B 3/18 132/321 |
| 2004/0250365 A1 * | 12/2004 | Anderson | A46B 15/0081 15/111 |
| 2013/0247533 A1 | 9/2013 | Zupan | |
| 2015/0182014 A1 * | 7/2015 | Ladva | A61B 17/244 15/111 |

* cited by examiner

*Primary Examiner* — Randall Chin
(74) *Attorney, Agent, or Firm* — Robert C. Montgomery; Montgomery Patent & Design LP.

(57) ABSTRACT

A tool includes a handle having a sweeping end and an opposed weeding end. The sweeping end encompasses a broom having a plurality of semi-rigid bristles. The broom can be a standard sweep-type broom or a push broom. The weeding end includes at least one (1) rigid hook member configured to remove weeds from between cracks or similar locations.

9 Claims, 3 Drawing Sheets

WEED AND SWEEP TOOL

RELATED APPLICATIONS

The present invention was first described in and claims the benefit of U.S. Provisional Application No. 62/072,126 filed Oct. 29, 2014, the entire disclosures of which are incorporated herein by reference.

FIELD OF THE INVENTION

The present invention relates generally to a combination tool including a broom end and a weeding end.

BACKGROUND OF THE INVENTION

Many people spend countless hours maintaining and beautifying their lawns and landscaping. As a matter of pride and personal expression, such people manicure and maintain their grass, flowers, shrubs, bushes and trees all for the sake of enhancing the aesthetic qualities of their property. Another important task in maintaining the appearance of one's property is the removal of weeds and grass from cracks in paved surfaces such as driveways, sidewalks, and patios.

In order to perform this task, many people resort to the use of herbicides. However, such herbicidal chemicals can also land on desirable grasses, flowers, trees, or fruit and vegetable gardens. Additionally, many people have legitimate health concerns regarding the use of such chemicals around children and pets. Therefore, if chemical removal is out of the question, the only remaining method of removing such unwanted plant growth is to physically remove the plants by pulling or scraping them out.

While this approach is frequently adopted it nevertheless forces the user to bend over or kneel down, both motions many find difficult or impossible to repeatedly perform. Accordingly, there exists a need for a means by which weeds and grass can be removed from paved surfaces in a manner that addresses the current problems described above. The use of the tool provides a means of removing weeds and grass from paved surfaces in a manner which is not only quick, easy and effective, but also safe and instantaneous.

SUMMARY OF THE INVENTION

The inventor has recognized the aforementioned inherent problems and lack in the art and observed that there is a need for a combination tool including a broom end and a weeding end.

It is therefore an object of the invention to provide a tool, consisting of a handle which has a handle first end and a handle second end, an extraction head attached to the handle first end and a broom attached to the handle second end. The broom consists of a carrier which has a neck located at a central portion on a carrier first side and is capable of attaching to the handle, a plurality of bristles which are affixed to a carrier second side and a skirt which is attached to the carrier and secured about the plurality of bristles at the carrier second side. The handle first end may be threaded and the well may contain a threaded cavity which is capable of being removably secured to the handle first end. The handle second end may likewise be threaded and the neck may contain a threaded cavity capable of being removably secured to the end of the handle second end.

The extraction head also consists of a shank at a distal end and a well on a proximal end. The shank also consists of a shank first end and a shank second end. The shank first end projects arcuately and oppositely away from the shank second end. Additionally, the shank further consists of a shank first end having a smaller cross-section than a shank second end. The shank first and second ends each may terminate in a point.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
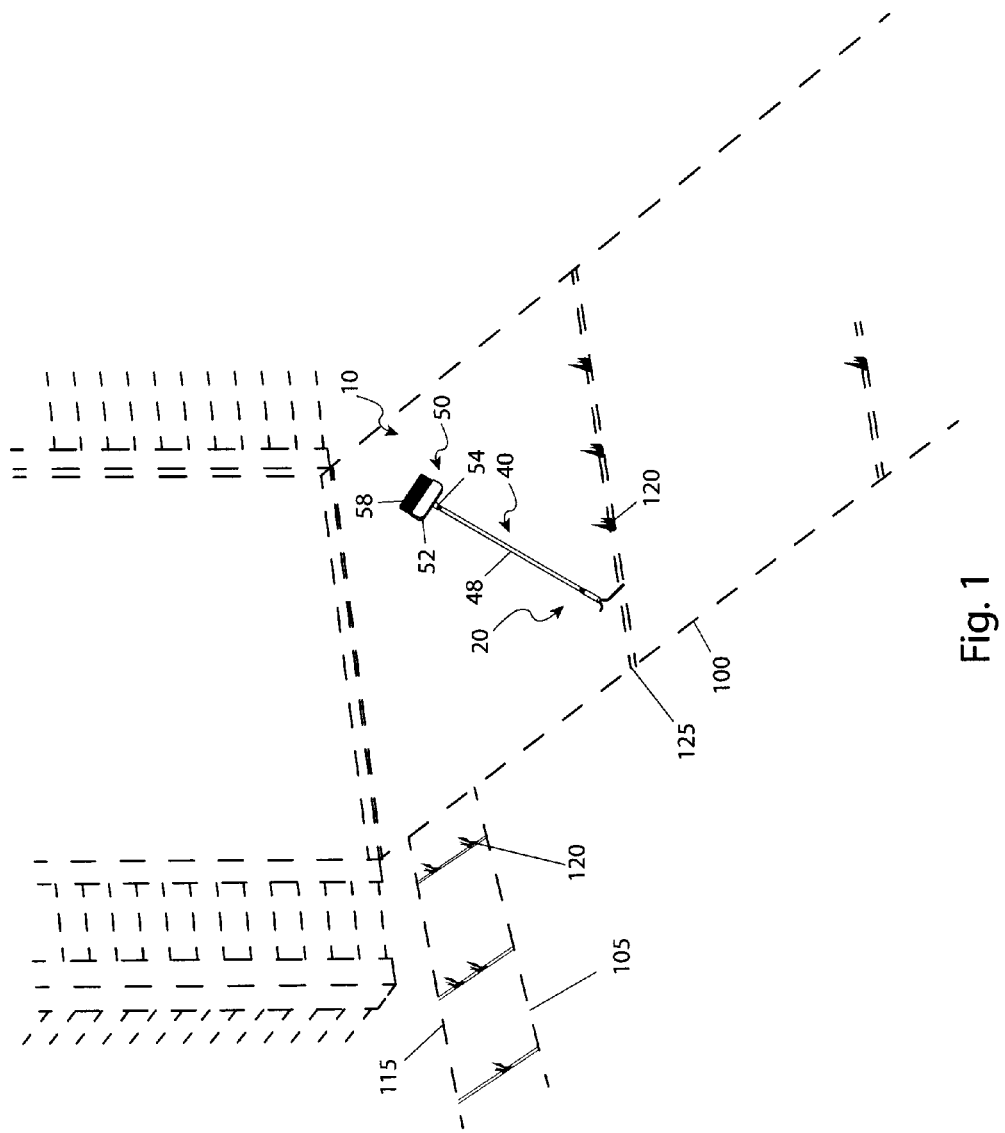
FIG. 1 is an environmental view of a weed and sweep tool 10 in accordance with the preferred embodiment of the present invention.

DESCRIPTIVE KEY 10 weed and sweep tool
20 extraction head
22 first end
24 heavy point
26 second end
28 light point
32 shank
34 threaded well
40 handle
42 handle first end
44 external thread
46 handle second end
48 grip
50 broom
52 carrier
54 neck
56 skirt
58 bristle
62 handle aperture
100 driveway
105 side walk
115 concrete block
120 vegetation
125 crevice

DETAILED DESCRIPTION OF THE PREFERRED EMBODIMENT

Figure 2:
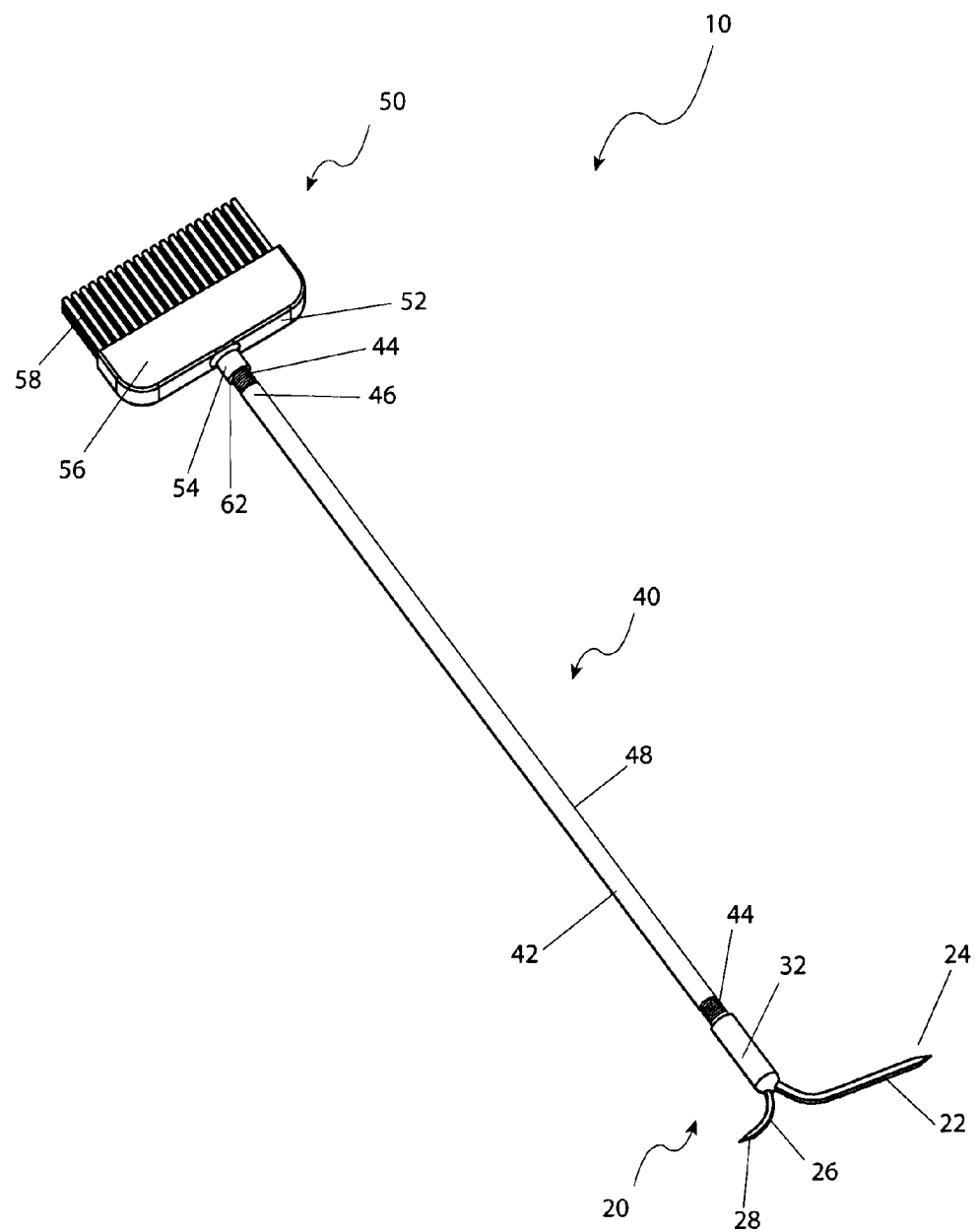
FIG. 2 is isometric view of the weed and sweep tool 10 in accordance with the preferred embodiment of the present invention; and, FIG. 3 is an isolated view of the extraction head 20 of the weed and sweep tool 10 in accordance with the preferred embodiment of the present invention.
Figure 3:
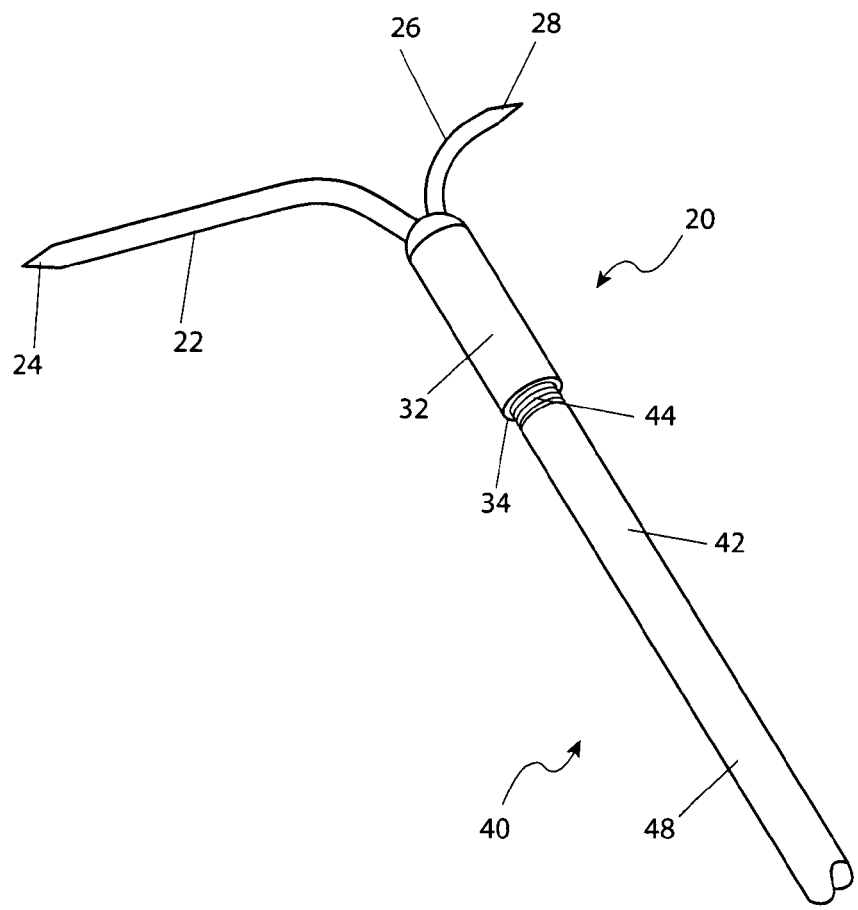

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a weed and sweep tool (herein referred to as the "apparatus") 10, which provides a means to scrape vegetation 120 and soil from the crevices 125 between concrete blocks 115, or other paving blocks, in a driveway 100, or a side walk 105, with an extraction head 20 disposed at a handle first end 42, and to gather the displaced material with a broom 50 attached to a handle second end 46.

Referring now to FIG. 1, an isometric view depicted in use, and FIG. 2, an isometric view of the apparatus 10, according to the preferred embodiment of the present invention, are disclosed. The apparatus 10 includes an extraction head 20 attached to a handle first end 42. The extraction head 20 is composed of a shank 32 preferably being a rigid thermoplastic material formed as a cylinder with a hemisphere at a distal end and a threaded well 34 on a proximal end for the threaded attachment of a handle 40. Other materials may be utilized in other embodiments without limiting the scope or intent of the apparatus 10. The internal thread may be of any of a number of standard threads, or a specialty thread, which could be cut, or formed into the threaded well 34 to match an external thread disposed on a handle first end 42 of the handle 40. It is understood that the apparatus 10 may be configured without the threaded well 34 if another detachable means of connection between the extraction head 20 and the handle 40 is utilized without limiting the scope of the apparatus 10. In an alternate embodiment, the shank 32 may be elongated in a direction along the central axis so as to provide a user with sufficient material to grasp if a decision were made to utilize the extraction head 20 without the removable handle 40. In a preferred embodiment, the shank 32 is provided with a first end 22 and a second end 26 configured to be cylindrical metal rods inserted into apertures formed into the shank 32 and retained by an interference fit.

The first end 22 is configured to project arcuately from the distal end of the shank 32 so as to eventually form a perpendicular to the central axis of the shank 32 and progress from there for some distance to terminate at a heavy point 24. The second end 26 is preferably slightly less massive than the first end 22 having a slightly smaller cross-section. The second end 26 projects arcuately from the distal end of the shank 32 in a direction opposite from the first end 22 to terminate in a light point 28. The light point 28 of the second end 26 would be capable of fitting into more narrow crevices 125 than the heavy point 24 of the first end 22 as illustrated in FIG. 3.

The handle 40 is preferably configured to be a cylindrical rod, or tube, with an external thread disposed on the handle first end 42 and a handle second end 46. The external thread 44 would preferably be any one (1) of a standard acme thread to be accommodated in the internally threaded well 34 of the shank 32 or a handle aperture 62 of an attachable broom 50. The handle 40 may be composed of a hardwood rod, or a tubular metal shaft, having sufficient length to provide a user with an ample grip 48 so as to obviate bending their torso while utilizing the apparatus 10. In some embodiments, the handle 40 may be provided with some type of cover, or coating, to improve the comfort or friction characteristics for a user.

Attached to the handle second end 46, via the external thread 44, is a broom 50. The broom 50 is configured to have a plurality of semi-rigid bristles 58 supported in a carrier 52. The bristles 58 may be composed of any natural or synthetic material having a sufficient toughness to acceptably withstand being abraded across a concrete block 115, or other material utilized in the construction of a driveway 100 or side walk 105, and a length adequate to brush debris in an intended direction. The carrier 52 is preferably a rectangular block of thermoplastic into which bundled groups of bristles 58 are molded, or otherwise inserted, to form a fairly dense array. Other materials, such as wood or metal, and/or other methods of retaining a plurality of bristles 58 may be utilized without limiting the scope of the apparatus 10. All, or part, of the carrier 52 and a proximal end of the bristles 58 is preferably covered with a skirt 56 for aesthetic purposes. The skirt 56 is configured to be a thermoplastic material, or light gage metal sheet, which may be presented in a wide variety of colors and surface affectations to suit the taste of a user. It is understood that the broom 50 may be configured without the skirt 56 without limiting the scope or intent of the apparatus 10. The carrier 52 is provided with a preferably cylindrical neck 54 in which a threaded handle aperture 62 is disposed. The neck 54 may be formed with the carrier 52, as in a molded thermoplastic part, or attached by some other means in a subsequent manufacturing process. The thread within the handle aperture 62 is configured to conform to the external thread 44 disposed on the handle second end 46.

The preferred embodiment of the present invention can be utilized by an enabled individual in a simple and straight-forward manner with little or no training. After initial purchase or acquisition of the apparatus 10, it would be implemented as depicted in FIG. 1. The method of installing and utilizing the apparatus 10 may be achieved by performing the following steps: acquiring a model of the apparatus 10 having a desired style to suit the taste of a user; inserting the heavy point 24, or the light point 28 at the discretion of the user, of the extraction head 20 into a crevice 125 between the concrete blocks 15 comprising a driveway 100 or side walk 105 into which undesirable vegetation 120 has grown; pulling the inserted end of the extraction head 20 through the crevice 125 to excise at least a top portion of the vegetation 120 by means of force applied to the grip 48 of the handle 40; rotating the handle 40, end-for-end, to place the bristles 58 of the broom 50 into contact with the concrete block 115; collecting the displaced vegetation 120, along with any displaced soil or other debris, with a sweeping motion; removing the collected material and properly disposing of it. The extraction head 20 may be utilized without the detachable broom 50 if so desired. If the extraction head 20 is configured to have an extended shank 32, the user may elect to utilize the extraction head 20 without the removable handle 40. The broom 50 may be utilized for sweeping without the detachable extraction head 20.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A tool, comprising:
   a handle, having a handle first end and a handle second end;
   an extraction head attached to said handle first end comprising:

a shank at a distal end having a shank first end and a shank second end; and, a well on a proximal end;

wherein said shank first end projects arcuately and oppositely away from said shank second end; and, a broom attached to said handle second end comprising a carrier, having a neck located at a central portion on a carrier first side capable of attaching to said handle;

a plurality of bristles affixed to a carrier second side; and, a skirt attached to said carrier and secured about said plurality of bristles at said carrier second side.

2. The tool of claim 1, wherein said shank first end has a smaller cross-section than said shank second end.

3. The tool of claim 2, wherein said shank first and second ends each terminate in a point.

4. A tool, comprising:

a handle, having a handle first end and a handle second end;

an extraction head attached to said handle first end comprising:

a shank at a distal end having a shank first end and a shank second end; and, a well on a proximal end;

wherein said shank first end projects arcuately and oppositely away from said shank second end; and, wherein said well comprises a threaded cavity capable of being removably secured to said handle first end;

a broom attached to said handle second end comprising a carrier, having a neck located at a central portion on a carrier first side capable of attaching to said handle;

a plurality of bristles affixed to a carrier second side; and, a skirt attached to said carrier and secured about said plurality of bristles at said carrier second side;

wherein said handle first end is threaded.

5. The tool of claim 4, wherein said shank first end has a smaller cross-section than said shank second end.

6. The tool of claim 5, wherein said shank first and second ends each terminate in a point.

7. A tool, comprising:

a handle, having a handle first end and a handle second end;

an extraction head attached to said handle first end comprising:

a shank at a distal end having a shank first end and a shank second end; and, a well on a proximal end;

wherein said shank first end projects arcuately and oppositely away from said shank second end; and, wherein said well comprises a threaded cavity capable of being removably secured to said handle first end;

a broom attached to said handle second end comprising:

a carrier, having a neck located at a central portion on a carrier first side capable of attaching to said handle;

a plurality of bristles affixed to a carrier second side; and, a skirt attached to said carrier and secured about said plurality of bristles at said carrier second side;

wherein said neck comprises a threaded cavity capable of being removably secured to said handle second end;

wherein said handle first and second ends are each threaded.

8. The tool of claim 7, wherein said shank first end has a smaller cross-section than said shank second end.

9. The tool of claim 8, wherein said shank first and second ends each terminate in a point.

* * * * *